(12) United States Patent  
Hsu et al.

(10) Patent No.: US 7,911,757 B2
(45) Date of Patent: Mar. 22, 2011

(54) TRAVEL OUTLET DEVICE

(75) Inventors: Jung-Hui Hsu, Chung Ho (TW);
Ming-Chou Kuo, Chung Ho (TW);
Yu-Lung Lee, Chung Ho (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 0 days.

(21) Appl. No.: 11/723,870

(22) Filed: Mar. 22, 2007

(65) Prior Publication Data
US 2008/0158765 A1    Jul. 3, 2008

(30) Foreign Application Priority Data

Jan. 3, 2007  (TW) ............................... 96100236 A

(51) Int. Cl.
*H01C 7/12*    (2006.01)

(52) U.S. Cl. ....... 361/118; 361/91.1; 307/150; 307/151; 439/221; 439/339; 439/501; 439/528; 439/535; 439/638; 439/652

(58) Field of Classification Search .................. 361/118; 439/535
See application file for complete search history.

(56) References Cited

U.S. PATENT DOCUMENTS

| | | | |
|---|---|---|---|
| D416,234 S * | 11/1999 | Veino et al. ............... | D13/160 |
| 6,359,764 B1 * | 3/2002 | Chou ........................ | 361/93.1 |
| 6,427,290 B1 * | 8/2002 | Liu ........................... | 24/16 R |
| 6,556,410 B1 * | 4/2003 | Manning et al. ........... | 361/118 |
| 6,607,408 B2 * | 8/2003 | Milan ........................ | 439/752.5 |
| 6,699,058 B1 * | 3/2004 | Estrela et al. ............. | 439/346 |
| 6,854,989 B2 * | 2/2005 | Milan ........................ | 439/131 |
| 7,300,306 B2 * | 11/2007 | Le et al. ................... | 439/502 |
| 2003/0148656 A1 * | 8/2003 | Huang ....................... | 439/501 |
| 2006/0194467 A1 * | 8/2006 | Beasley et al. ............ | 439/339 |

OTHER PUBLICATIONS

Tripp Lite, Protect It! Traveler in-Line Surge Suppressors Owner's Manual, 2004, Tripp Lite.*
Tripp-Lite, Traveler In-Line Surge Suppressor Owner's Manual, Feb. 2004.*
American Power Conversion, APC Notebook Surge Protector for AC and phone lines, 2 pin connection, 100-240V Owner's Manual, Aug. 1998.*
http://web.archive.org/web/*/http://www.apc.com/resource/include/techspec_index.cfm?base_sku=PNOTEPRO.*
http://web.archive.org/web/*/http://www.apc.com/resource/include/techspec_index.cfm?base_sku=PNOTEPRO, Jan. 2010.*

* cited by examiner

*Primary Examiner* — Stephen W Jackson
*Assistant Examiner* — Tien Mai
(74) *Attorney, Agent, or Firm* — McGinn IP Law Group, PLLC

(57) ABSTRACT

A travel outlet device is for connecting between an adapter and a power cable. The travel outlet device includes a case, a PCB and at least one power outlet unit. The case is connected with a power input portion and a power output portion. The PCB has a surge-protected circuit and is disposed inside the case. The PCB is electrically connected with the power input portion and the power output portion. The power outlet unit is disposed with the case and electrically connected with the PCB. Accordingly, the travel outlet device can provide the adapter surge-protected function so that users can get more power outlet units to connect to other electric equipments for convenient use.

11 Claims, 5 Drawing Sheets

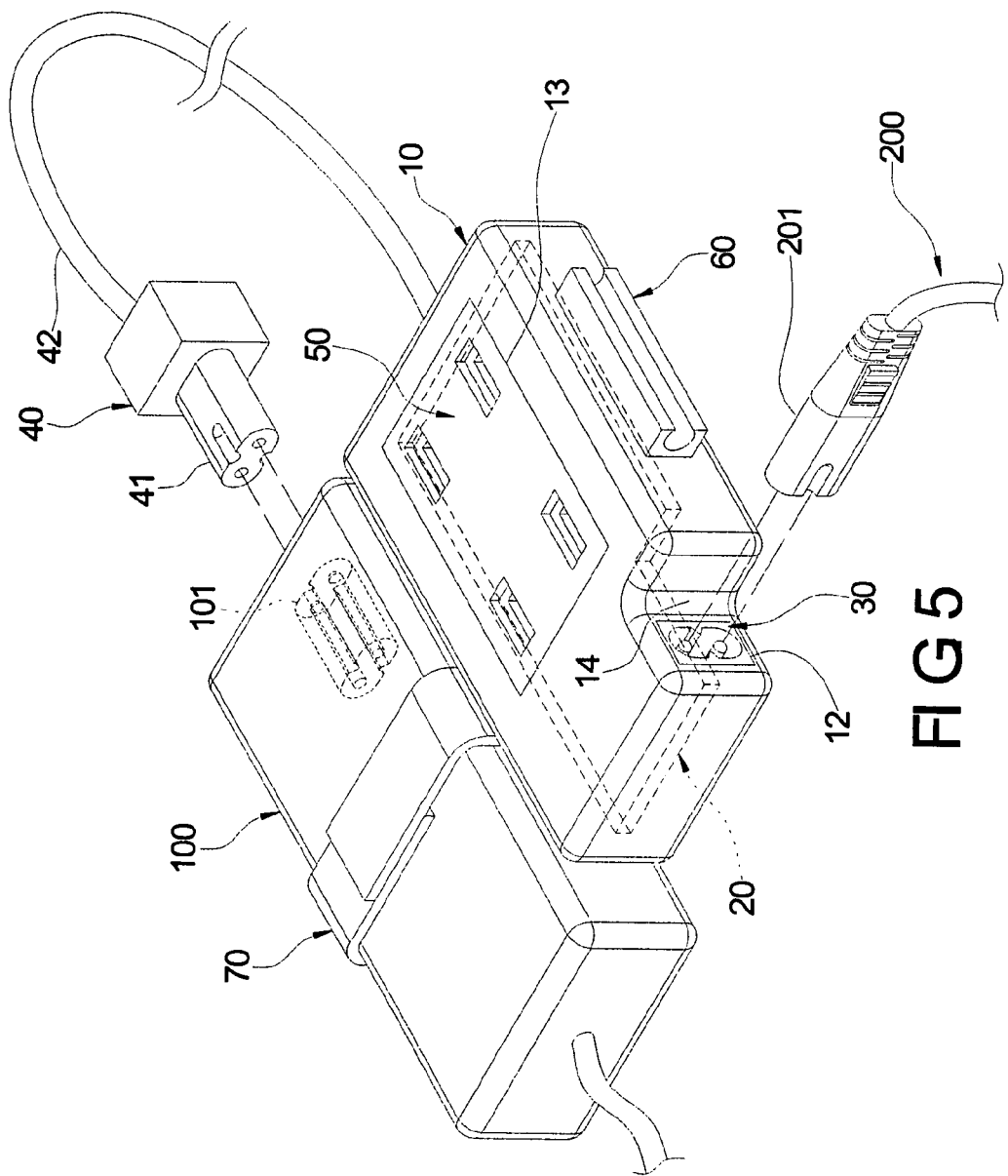

TRAVEL OUTLET DEVICE

BACKGROUND OF THE INVENTION

1. Field of the Invention

The present invention relates to a travel outlet device, and more especially to a travel outlet device with more than one power outlet units and a surge-protected circuit.

2. Description of the Prior Art

At present, besides batteries for supplying power, consumer electronics products have adapters and power cables to supplying predetermined work voltages and work currents for a long use.

Please referring to FIG. 1. A prior outlet device 10a is connected between an adapter 20a and a power cable 30a. The adapter 20a has an outlet 21a. One end of the power cable 30a has a joint 31a and the other end has an inlet 32a.

A protruding portion 11a protrudes from a rear end of the outlet device 10a for inserting into the outlet 21a of the adapter 20a. The outlet device 10a has a groove 12a in a left side, which has two metal projecting portions 121a inside to connect with the joint 31a on one end of the power cable 30a. The inlet 32a on the other end of the power cable 30a connects to an electrical source. The outlet device 10a has two inserting holes 13a in a front end for an inlet of an electric equipment inserting in. The electrical equipment can be supplied for electric power via the outlet device 10a.

However, conventional electrical sources often generate instantaneous abnormal voltage surges because of the stroke of lightning or short-circuit, etc. Since the outlet device 10a has not a surge-protected mechanism, when the voltage has larger instantaneous surges, the outlet device hasn't any protection function and the adapter and other electric equipments are easily damaged.

Hence, the inventors of the present invention believe that the shortcomings described above are able to be improved and finally suggest the present invention which is of a reasonable design and is an effective improvement based on deep research and thought.

SUMMARY OF THE INVENTION

An object of the present invention is to provide a travel outlet device which is connected between an adapter and a power cable to provide a surge-protected function for the adapter and has at least one power outlet units to connect to other electric equipments for use.

To achieve the above-mentioned object, a travel outlet device in accordance with the present invention is disclosed. A travel outlet device for connecting between an adapter and a power cable includes a case having a power input portion and a power output portion; a printed circuit board which is disposed inside the case and has a surge-protected circuit, the printed circuit board electrically connecting with the power input portion and the power output portion, respectively; and at least one power outlet unit which is disposed with the case and electrically connects with the printed circuit board.

The efficacy of the present invention is as follows: the present invention has more than one power outlet units for connecting to other electric equipments and a surge-protected circuit which can eliminate surges before electrical sources provides power for adapters or other electric equipments connecting with the present invention, thereby to avoid damaging the adapters or other electric equipments.

To further understand features and technical contents of the present invention, please refer to the following detailed description and drawings related the present invention. However, the drawings are only to be used as references and explanations, not to limit the present invention.

BRIEF DESCRIPTION OF THE DRAWINGS

FIG. 5 is a perspective view of a third embodiment of the travel outlet device in accordance with the present invention.

DETAILED DESCRIPTION OF THE INVENTION

Figure 1:
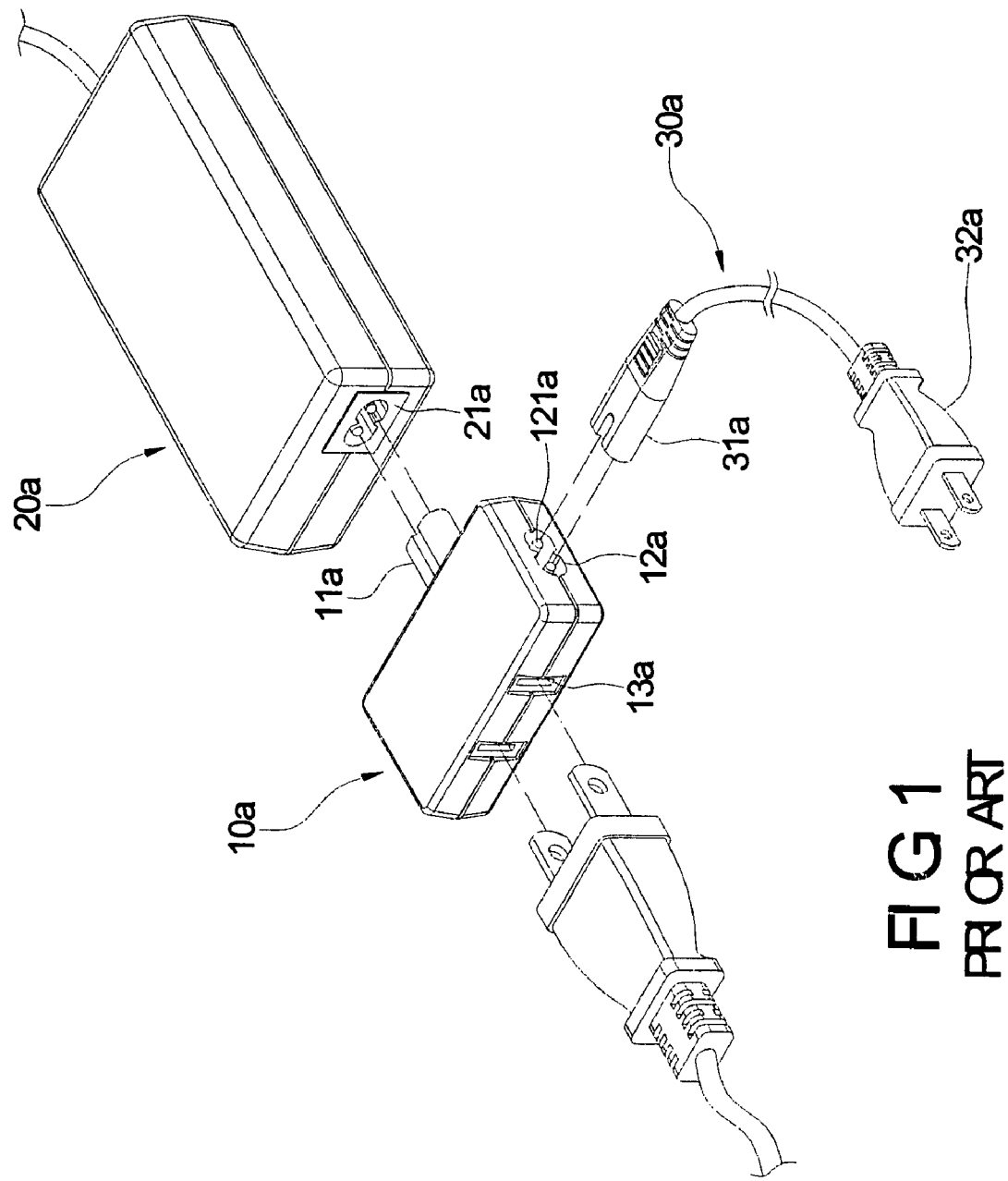
FIG. 1 is a perspective view of a prior outlet device.
Figure 2:
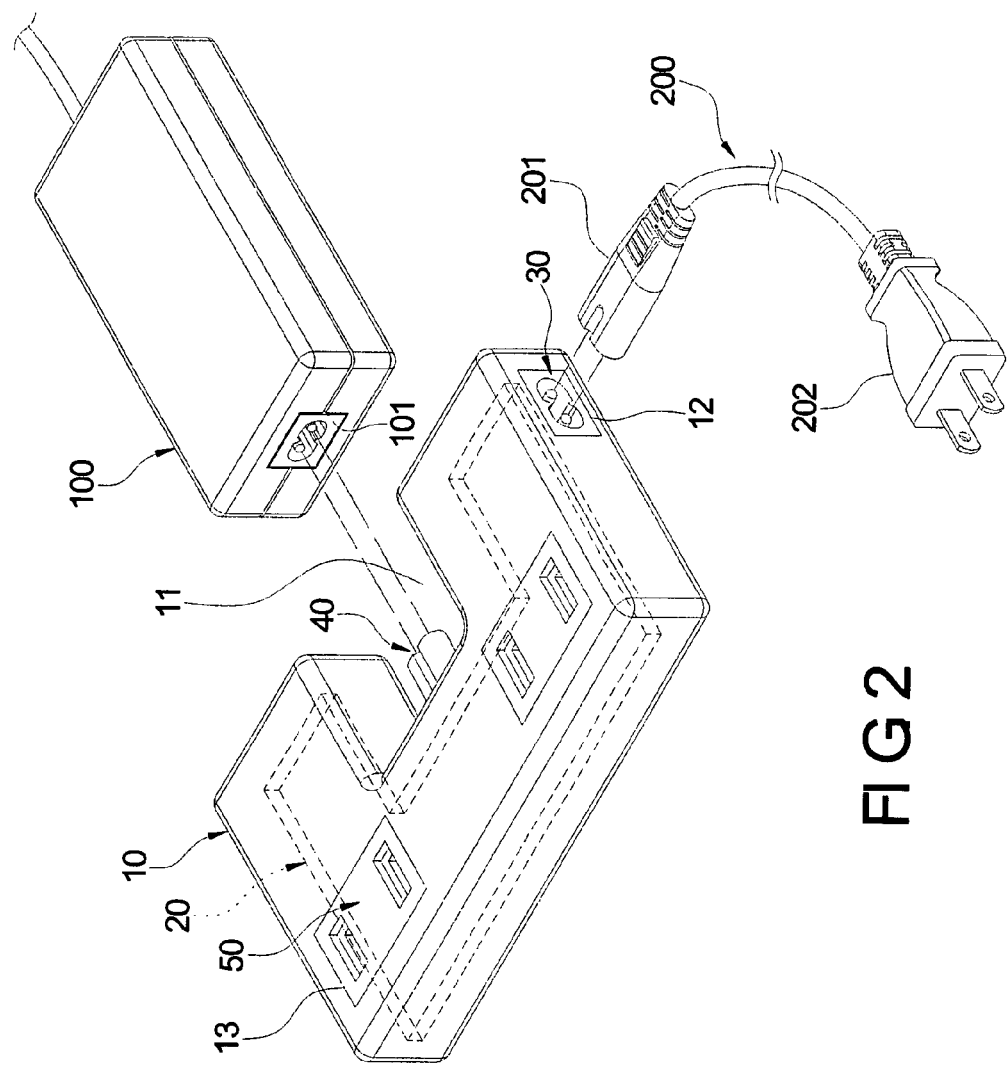
FIG. 2 is a perspective view of a first embodiment of a travel outlet device in accordance with the present invention.

Please referring to FIG. 2, a travel outlet device in accordance with a first embodiment of the present invention is shown. The travel outlet device is for connecting between an adapter 100 and a power cable 200. The adapter 100 has an outlet 101. One end of the power cable 200 connects with a joint 201 and the other end connects with an inlet 202 for connecting to an electrical source. The travel outlet device includes a case 10, a printed circuit board (PCB) 20, a power input portion 30, a power output portion 40 and two power outlet units 50.

The case 10 is made of insulating material. The case 10 has an engaging portion 11 concavely on a rear end. The engaging portion 11 corresponds to a front end of the adapter 100 and can receive the front end of the adapter 100 in. A first opening 12 is formed on a side of the case 10 and corresponds to the power input portion 30. The case 10 further forms two second openings 13 on a surface, corresponding to the two power outlet units 50.

Figure 3:
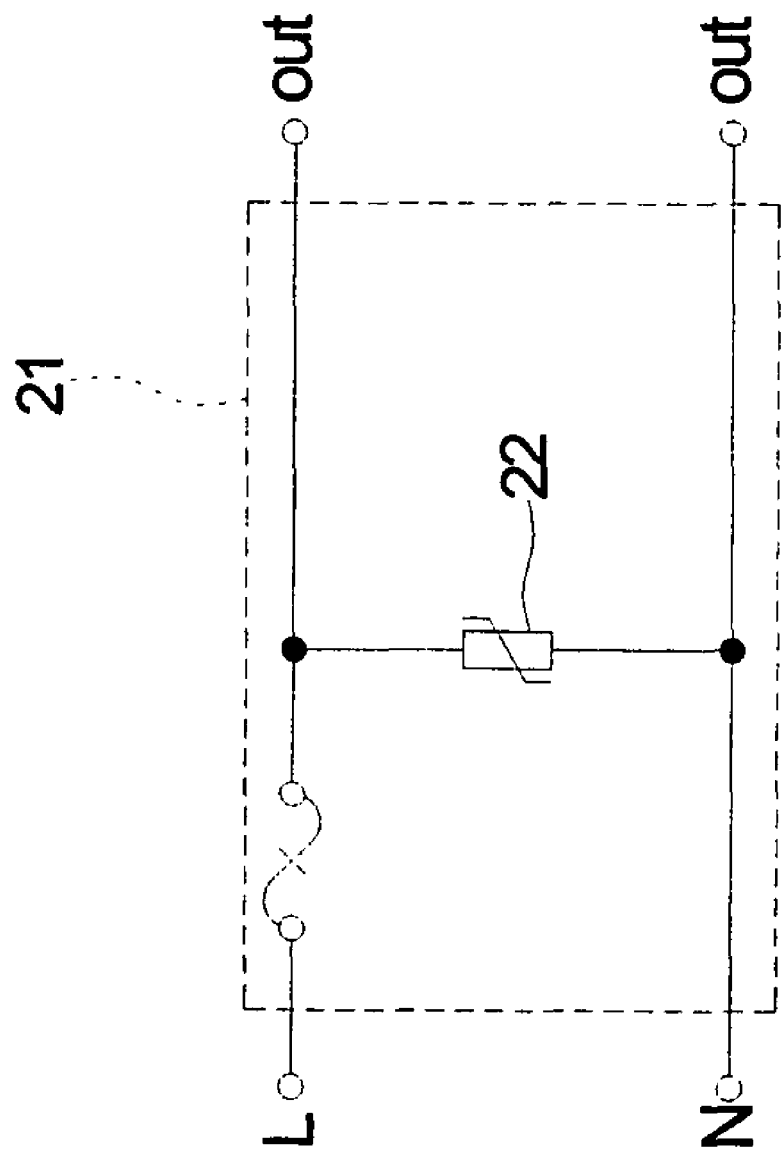
FIG. 3 is a circuit wiring diagram of a surge-protected circuit of the travel outlet device in accordance with the present invention.

The PCB 20 is disposed inside the case 10 and has a surge-protected circuit 21 (please referring to FIG. 3). The surge-protected circuit 21 has a metal oxide varistor (MOV) 22 to form a surge-protected mechanism for effectively avoiding instantaneous surges.

The power input portion 30 is disposed inside the case 10 and electrically connects with the PCB 20. In this embodiment, the power input portion 30 is a C8-type outlet, but not limited to this, and also can be a C6-type outlet or other types of outlets (not shown). The power input portion 30 is exposed to the first opening 12 and corresponds to the joint 201 of the power cable 201.

The power output portion 40 is disposed inside the engaging portion 11 of the case 10 and electrically connects with the PCB 20. The power output portion 40 protrudes from the surface of the case 10. In this embodiment, the power output portion 40 is a C7-type joint, but not limited to this, and also can be a C5-type joint or other types of joints (not shown). The power output portion 40 corresponds to the outlet 101 of the adapter 100.

The two power outlet units 50 electrically connect with the PCB 20 and are respectively exposed to the second openings 13 of the case 10. In this embodiment, the two power outlet units 50 are mounted inside the case 10, but not limited to this, and can connect with the case 10 via an extension cord (not shown) to expand the scope of use of power supplies.

The front end of the adapter 100 is inserted into the engaging portion 11 of the case 10 to insert the power output portion 40 in the outlet 101 of the adapter 100, thereby to engage the adapter 100 with the case 10 directly. The joint 201 of the power cable 200 is inserted into the power input portion 30. The power outlet unit 50 can connect with inlets (not shown) of other electric equipments. The inlet 202 of the power cable 200 connects to a conventional electrical source from which an electrical current is input into the PCB 20 via the power cable 200 and then respectively transmitted to the adapter 100 and other electric equipments (not shown) via the PCB 20.

Figure 4:
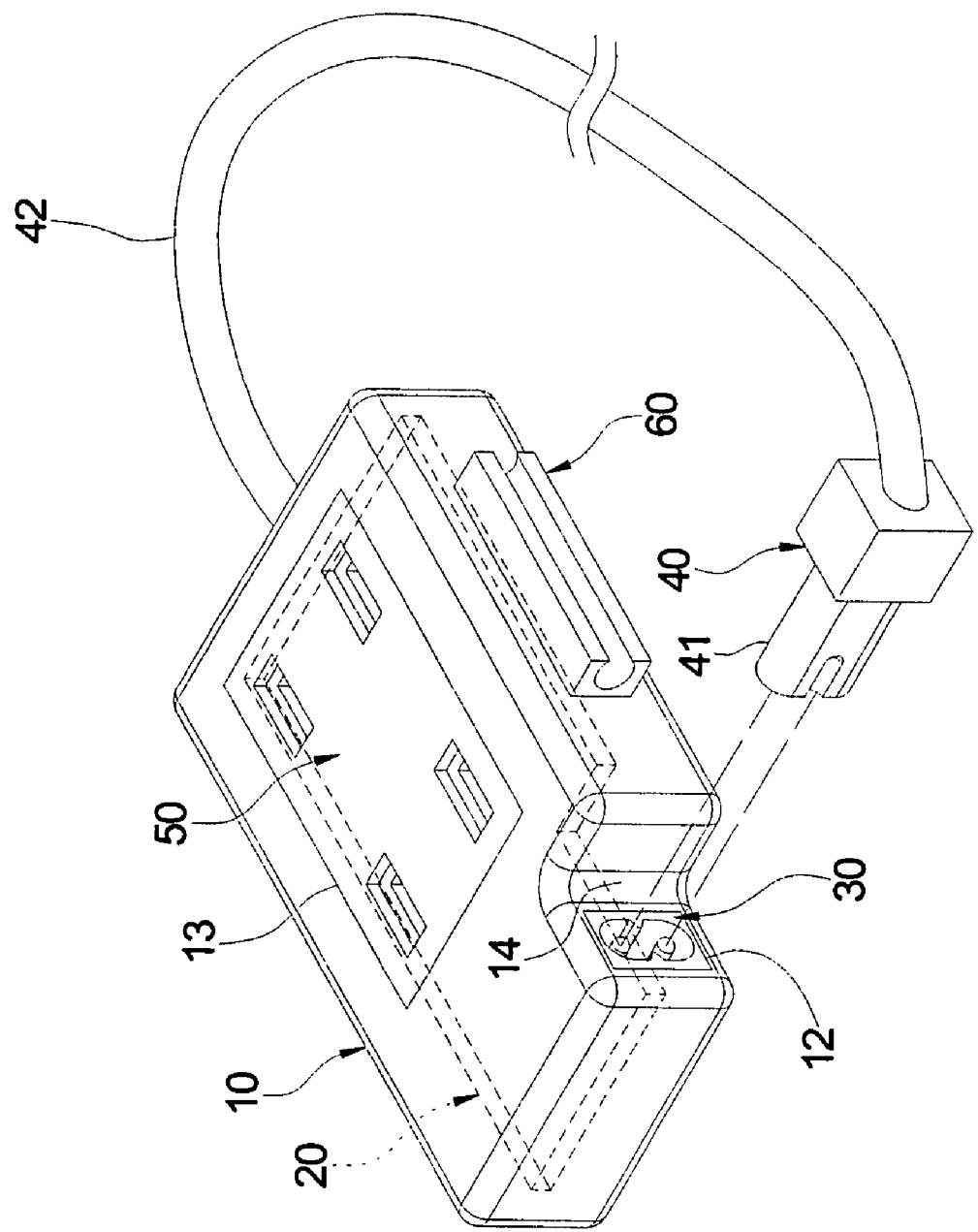
FIG. 4 is a perspective view of a second embodiment of the travel outlet device in accordance with the present invention.

Please referring to FIG. 4, a second embodiment of the present invention is shown. The difference between the second embodiment and the first embodiment is as follows:

The case 10 has a receiving portion 14 concavely at a corner of the front end. The first opening 12 is disposed inside the receiving portion 14 and exposes the power input portion 30 to the receiving portion 14. The power output portion 40 is positioned outside the case 10 and the shape of the receiving portion 14 corresponds to that of the power output portion 40.

A joint 41 corresponding to the power input portion 30 protrudes from a front end of the power output portion 40. In an idle state, the joint 42 can be inserted in the power input portion 30. When the joint 41 of the power output portion 40 is inserted in the power input portion 30, the power output portion 40 is properly received in the receiving portion 14.

A cable 42 extends from a rear end of the power output portion 40 and is connected between the case 10 and the power output portion 40. A clamping wire structure 60 is disposed on a side of the case 10 for clamping the cable 42, so that the cable 42 and the power output portion 40 can be combined with the case 10. In this embodiment, the clamping wire structure 60 is a string gripper, but not limited to this, and also can be a groove (not shown) concavely inwards on a fringe of the case 10 for embedding and fixing the cable 42.

When the power output portion 40 engages with the adapter 100, the case 10 can keep a distance from the adapter 100 via the cable 42 so that users can adjust positions of the devices basing upon needed space.

Please referring to FIG. 5, a third embodiment of the present invention is shown. The difference between the third embodiment and the second embodiment is as follows:

The third embodiment further has a holding structure 70. The holding structure 70 is mounted on a side of the case 10 for fixing the traveling outlet device on a predetermined device (such as the adapter 100 etc.) or a predetermined position (such as a tabletop etc.). In this embodiment, the holding structure 70 is a belt assembly with buckles, but not limited to this, and also can be other devices made of material with a holding function. Alternatively, the holding structure 70 can be mounted on the adapter 100 in various ways such as fastening to engage the adapter 100 with the case 10.

Accordingly, when instantaneous abnormal voltage surges are generated, for example, when the stroke of lightning or short-circuit causes instantaneous abnormal voltage surges, the travel outlet device can ensure that the adapter 100 and other electric equipments which connect with the travel outlet device are completely protected and avoid being damaged because of the surges. Furthermore, the present invention has power outlet units 50 with more than one plugholes for providing power for other electric equipments, thereby users can still use other electric equipments when there are less power outlets in rooms. The power outlet units 50 can be mounted on the case 10 directly, or connect with the case 10 via an extension cord (not shown) to expand the scope of use of power supplies.

Additionally, the case 10 can be separated from the adapter 100, and also can engage with the adapter 100 via the holding structure 70, which is convenient for use.

What are disclosed above is only the preferred embodiments of the present invention and it is therefore not intended that the present invention be limited to the particular embodiments disclosed. It will be understood by those skilled in the art that various equivalent changes may be made depending on the specification and the drawings of present invention without departing from the scope of the present invention.

What is claimed is:

1. A travel outlet device for connecting between an adapter and a power cable, wherein the adapter has an outlet, the travel outlet device comprising:
    a case combined with the adapter, the case comprising:
        first and second lateral sides, first and second end sides which are connected to the first and second lateral sides, and an upper side having a periphery which is connected to the first and second lateral sides and first and second end sides;
        a power output portion which is connected to the first end side of the case via an alternating current cable and comprises a joint formed at an end of the power output portion, wherein the power output portion protrudes from the first end side of the case, and the joint of the power output portion corresponds to the outlet of the adapter;
        a clamping wire structure for clamping the alternating current cable, the clamping wire structure being disposed on the first lateral side of the case and being in one piece;
        a concave receiving portion formed at a corner of the case between the first lateral side and the second end side of the case, a shape of the concave receiving portion corresponding to a shape of the power output portion, the concave receiving portion comprising a first wall connected to the first lateral side and a second wall connected to the first wall and to the second end side, and the periphery of the upper side being connected to the first and second walls of the concave receiving portion, wherein the second wall has an opening formed therein; and
        a power input portion comprising an outlet which is formed inside the second wall of the concave receiving portion and exposed to the opening of the second wall, a joint of the power cable being corresponded and insertable into the outlet of the power input portion to electrically connect the device to a power supply and the joint of the power output portion being insertable into the outlet of the power input portion such that the power output portion is received in the concave receiving portion in order to protect the power output portion;
    a printed circuit board, disposed inside the case and having a surge-protected circuit, the printed circuit board electrically connecting with the power input portion and the power output portion respectively; and
    at least one power outlet unit formed in the upper side of the case and electrically connecting with the printed circuit board.

2. The travel outlet device as claimed in claim 1, wherein the case further comprises a holding structure formed on the second lateral side, for fixing the travel outlet device on a predetermined position or a predetermined device.

3. The travel outlet device as claimed in claim 1, wherein the power input portion is a C8-type outlet or a C6-type outlet, and the power output portion is a C7-type joint or a C5-type joint.

4. The travel outlet device as claimed in claim 1, wherein said power output portion is receivable into the outlet of said adapter.

5. The travel outlet device as claimed in claim 4, wherein said case further comprises a holding structure formed on the second lateral side, for fixing said travel outlet device onto said adapter.

6. The case of claim 1, wherein the printed circuit board has a metal oxide varistor to form a surge-protected mechanism for the adapter.

7. The travel outlet device as claimed in claim 1, wherein the first wall of the concave receiving portion is substantially perpendicular to the second wall of the concave receiving portion, and said clamping wire structure is formed on said first lateral side of the case between the first wall of the concave receiving portion and the first end side of the case.

8. The travel outlet device as claimed in claim 1, wherein a type of the joint of the power output portion corresponds to a type of the outlet of the adapter, and a type of the joint of the power cable corresponds to a type of the power input portion.

9. The travel outlet device as claimed in claim 1, wherein a shape of the joint of the power output portion corresponds to a shape of the outlet of the adapter, and a shape of the joint of the power cable corresponds to a shape of the power input portion.

10. An apparatus for supplying power to an electronic product, comprising:
    an adapter comprising an outlet; and
    a travel outlet device for connecting between said adapter and a power cord, said travel outlet device including a case comprising:
        first and second lateral sides, first and second end sides which are connected to the first and second lateral sides, and an upper side having a periphery which is connected to the first and second lateral sides and first and second end sides;
        a power output portion which is connected to the first end side of the case via an alternating current cable and comprises a joint formed at an end of the power output portion, wherein the power output portion is a C7-type joint or a C5-type joint;
        a clamping wire structure being disposed on the first lateral side of the case for clamping the alternating current cable and combining the alternating current cable and the power output portion with the case, wherein the clamping wire structure is a string gripper or a grooved surface formed inwardly concave on the first lateral side of the case for embedding and fixing the cable;
        a concave receiving portion formed at a corner of the case between the first lateral side and the second end side of the case, a shape of the concave receiving portion corresponding to a shape of the power output portion, the concave receiving portion comprising a first wall connected to the first lateral side and a second wall connected to the first wall and to the second end side, and the periphery of the upper side being connected to the first and second walls of the concave receiving portion; and
        a power input portion comprising an outlet which is formed in the second wall of the concave receiving portion, a joint of the power cord being insertable into the outlet of the power input portion to electrically connect the device to a power supply and the joint of the power output portion being insertable into the outlet of the power input portion such that the power output portion is received in the concave receiving portion in order to protect the power output portion, wherein the power input portion is a C8-type outlet or a C6-type outlet.

11. The apparatus as claimed in claim 10, wherein the travel outlet device further comprises a printed circuit board disposed inside the case and having a surge-protected circuit, wherein the surge-protected circuit has a metal oxide varistor to form a surge-protected mechanism for the adapter.

* * * * *